United States Patent
Dale et al.

(10) Patent No.: US 7,904,539 B2
(45) Date of Patent: Mar. 8, 2011

(54) SYSTEM AND METHOD FOR SERVICING INQUIRY COMMANDS ABOUT TARGET DEVICES IN STORAGE AREA NETWORK

(75) Inventors: Stephen G. Dale, Dripping Springs, TX (US); Bradfred W. Culp, Greeley, CO (US)

(73) Assignees: Crossroads Systems, Inc., Austin, TX (US); Hewlett-Packard Company, Palo Alto, CA (US)

( * ) Notice: Subject to any disclaimer, the term of this patent is extended or adjusted under 35 U.S.C. 154(b) by 126 days.

(21) Appl. No.: 12/403,971

(22) Filed: Mar. 13, 2009

(65) Prior Publication Data
US 2009/0177840 A1  Jul. 9, 2009

Related U.S. Application Data

(62) Division of application No. 10/064,080, filed on Jun. 10, 2002, now Pat. No. 7,603,449.

(51) Int. Cl.
*G06F 15/173* (2006.01)
(52) U.S. Cl. .......... 709/223; 709/203; 709/224; 709/238
(58) Field of Classification Search .......... 709/201–203, 709/223–226, 238
See application file for complete search history.

(56) References Cited

U.S. PATENT DOCUMENTS

| | | | |
|---|---|---|---|
| 5,862,404 A | 1/1999 | Onaga | |
| 5,870,561 A | 2/1999 | Jarvis et al. | |
| 5,991,391 A | 11/1999 | Miloslavsky | |
| 6,003,064 A | 12/1999 | Wicki et al. | |
| 6,247,062 B1 | 6/2001 | Sarkar | |
| 6,247,077 B1 | 6/2001 | Muller et al. | |
| 6,249,800 B1 | 6/2001 | Aman et al. | |
| 6,324,584 B1 | 11/2001 | Mandalia | |
| 6,363,411 B1 * | 3/2002 | Dugan et al. | 709/202 |
| 6,532,493 B1 | 3/2003 | Aviani et al. | |
| 6,587,434 B1 | 7/2003 | Cousins | |
| 6,591,272 B1 | 7/2003 | Williams | |

(Continued)

FOREIGN PATENT DOCUMENTS

JP   2005-529398   9/2005

(Continued)

OTHER PUBLICATIONS

Kechel, Third Party Observation IN ep1512065, May 31, 2005, 4 pages.

(Continued)

*Primary Examiner* — Faruk Hamza
(74) *Attorney, Agent, or Firm* — Sprinkle IP Law Group (57) ABSTRACT

Inquiry data received from sequential target devices is stored in a cache memory. In one embodiment, the cache memory is coupled to a router. In one embodiment, when the router receives from a host an inquiry command about a target, the router first checks to see if the inquiry command can be serviced from the cache. If so, the inquiry data about the target is retrieved from the cache and returned to the host. If not, the router checks to see if the target is busy. If not busy, the router routes the inquiry command to the target and stores the inquiry data returned by the target in the cache. If the target is busy, the router places the inquiry command in a queue. When the target becomes available, the router forwards the inquiry command to the target for processing, thereby keeping the inquiry command from timing out.

17 Claims, 6 Drawing Sheets

U.S. PATENT DOCUMENTS

| | | | |
|---|---|---|---|
| 6,654,381 B2 | 11/2003 | Dally et al. | |
| 6,678,729 B1* | 1/2004 | Ahoor et al. | 709/224 |
| 6,725,272 B1 | 4/2004 | Susai et al. | |
| 6,850,980 B1 | 2/2005 | Gourlay | |
| 6,920,491 B2 | 7/2005 | Kim | |
| 6,950,864 B1 | 9/2005 | Tsuchiya | |
| 6,950,865 B1 | 9/2005 | Depaolantonio | |
| 6,976,072 B2* | 12/2005 | Mathieson | 709/224 |
| 7,379,998 B2* | 5/2008 | Love et al. | 709/224 |
| 7,581,050 B2* | 8/2009 | Honda | 710/240 |
| 7,603,449 B1 | 10/2009 | Dale et al. | |
| 7,605,933 B2 | 10/2009 | Smithson | |
| 2002/0122390 A1 | 9/2002 | Garff et al. | |
| 2002/0196463 A1* | 12/2002 | Schlonski et al. | 358/1.15 |
| 2007/0266198 A1 | 11/2007 | Bousis | |
| 2009/0132589 A1 | 5/2009 | Daos et al. | |

FOREIGN PATENT DOCUMENTS

| | | |
|---|---|---|
| WO | WO 03/104971 | 12/2003 |

OTHER PUBLICATIONS

ISA Server 2000 On-line Documentation, accessed and downloaded Oct.19, 2005, 580 pages.

ISA Server : Internet Security and Acceleration Server from Microsoft. The ISA Server Site, retrieved from the Internet: <URL:www.microsoft.com>, Oct. 19, 2005, 2 pages.

Microsoft ISA Server: Product Overview, retrieved from the Internet: <URL: www.microsoft.com> Oct. 19, 2005, 11 pages.

Internet Junkbuster Distribution Information, retrieved from the Internet <URL: www.junkbusters.com/ijbdist.html>, Oct. 19, 2005, 4 pages.

Internet Junkbuster Headlines retrieved from the Internet: <URL: www.junkbusters.com/ijb.html>, Oct. 19, 2005, 2 pages.

Squid Web Proxy Cache, Printouts retrieved from the Internet: <URL: www.squid-cache.org>, Oct. 19, 2005, 5 pages.

Squid Configuration Manual, retrieved from the Internet: <URL: www.squid-cache.org>, Oct. 19, 2005, 86 pages.

Printouts retrieved from the Internet: <URL:www.privoxy.org>, Oct. 19, 2005, 2 pages.

Privoxy 3.0.3 User Manual, retrieved from the Internet: <URL: http://www.privoxy.org/>, Oct. 19, 2005, 93 pages.

Privoxy FAQs, retrieved from the Internet: <URL:http://www.privoxy.org/>, Oct. 19, 2005, 32 pages.

Proxy—Wikipedia retrieved from the Internet: <URL:http://www.wikipedia.org/>, Oct. 19, 2005, 3 pages.

Jap—Anonymity & Privacy, Protection of Privacy on the Internet, retrieved from the Internet: <URL:http://anon.inf.tu-dresden.de>, Oct. 19, 2005, 4 pages.

Jap—Anonymity & Privacy, JAB at CeBit 2002, retrieved from the Internet: <URL:http://anon.inf.tu-dresden.de>, Oct. 19, 2005, 5 pages.

Cyber Guard/Webwasher Classic, accessed and downloaded from www.cyberguard.com, Oct. 19, 2005, 1 page.

Oops! FAQ, accessed and downloaded from http://zipper.paco.net, Oct. 19, 2005, 2 pages.

Configuring File for OOPS Proxy Cache Server, no date, 13 pages.

Printouts of Pages from WWWOFFLE Homepage, accessed and downloaded from www.gedanken.demon.co.uk, Oct. 19, 2005, 4 pages.

Printouts retrieved from the Internet: <URL: www.apsis.ch/pound/POUND-Reverse-Proxy> and Load-Balancer, Oct. 19, 2005, 12 pages.

Tor: An Anonymous Internet Communication System, retrieved from the Internet: <URL:http://tor.eff.org>, Oct. 19, 2005, 2 pages.

Tor MS Windows Install Instructions, retrieved from the Internet: <URL: http://tor.eff.org>, Oct. 19, 2005, 7 pages.

Tor Mac OS X Install Instructions, retrieved from the Internet: <URL: http://tor.eff.org>, Oct. 19, 2005, 7 pages.

Tor Linux/BSD/Unix Install Instructions, retrieved from the Internet: <URL: http://tor.eff.org>, Oct. 19, 2005, 3 pages.

Tor Server Configuration Instructions, retrieved from the Internet: <URL: http://tor.eff.org>, Oct. 19, 2005, 4 pages.

Tor SwitchProxy Install Instructions, retrieved from the Internet: <URL: http://tor.eff.org>, Oct. 19, 2005, 9 pages.

Tor Hidden Service Configuring Instructions, retrieved from the Internet: <URL:http://tor.eff.org>, Oct. 19, 2005, 4 pages.

Tor: The Second-Generation Onion Router, no date, 35 pages.

"To Protocol Specification," v 1.92 18:53:31, Sep. 2, 2005, retrieved from the Internet: <URL:http://tor.eff.org>, Oct. 19, 2005, 16 pages.

Tor Rendezvous Specification, Sep. 6, 2005, retrieved from the Internet: <URL: http://tor.eff.org>, Oct. 19, 2005, 8 pages.

Tor Directory Protocol for 0.1.1.x series, Oct. 14, 2005, retrieved from the Internet: <URL:http://tor.eff.org>, Oct. 19, 2005, 7 pages.

TC: A Tor control protocol (Version 1), v 1.57 13:49:13, Oct. 12, 2005, Oct. 19, 2005, 12 pages.

TheOnionRouter/TorifyHOWTO—Noreply Wiki, retrieved from the Internet: <URL:http://wiki.noreply.org>, Oct. 19, 2005, 21 pages.

TheOnionRouter/OperationalSecurity—Noreply Wiki, retrieved from the Internet: <URL:http://wiki.noreply.org>, Oct. 19, 2005, 11 pages.

TheOnionRouter/TorinChroot—Noreply Wiki, retrieved from the Internet: <URL:http://wiki.noreply.org>, Oct. 19, 2005, 7 pages.

TheOnionRouter/OpenbsdChrooted Tor—Noreply Wiki, retrieved from the Internet: <URL:http://wiki.noreply.org>, Oct. 19, 2005, 24 pages.

TheOnionRouter/SquidProxy—Noreply Wiki, retrieved from the Internet:<URL: http://wiki.noreply.org>, Oct. 19, 2005, 7 pages.

Tor: Overview, retrieved from the Internet: <URL:http://tor.eff.org>, Oct. 19, 2005, 5 pages.

Internet Junkbuster Frequently Asked Questions, retrieved from the Internet: <URL:www.junkbusters.com>, Oct. 19, 2005, 24 pages.

Internet Junkbuster Technical Information, retrieved from the Internet: <URL: www.junkbusters.com>, Oct. 19, 2005, 8 pages.

Proxomitron.Info . . . The Webhiker's Guide to Proxomitron, retrieved from the Internet: <URL:www.proxomitron.info>, Oct. 19, 2005, 112 pages.

BFilter Web Proxy,retrieved from the Internet: <URL: http://bfilter.courceforge.net/>, Oct. 19, 2005, 22 pages.

JanaServer 2—"What is the JanaServer 2?", retrieved from the Internet: <URL: www.janaserver.de/start/php>, Oct. 19, 2005, 2 pages.

JanaServer 2—Configuration Guide, no date, 19 pages.

JanaServer 2—FAQ, retrieved from the Internet: <URL:www.janaserver.de>, Oct. 19, 2005, 3 pgs.

Oops! Proxy Server, retrieved from the Internet: <URL:http://zipper.paco.net>, Oct. 19, 2005, 5 pages.

CROSSROADS SYSTEMS, INC., International Search Report issued in PCTUS2003/017884, Aug. 12, 2003, 6 pgs.

DALE, Office Action issued in U.S. Appl. No. 10/064,080, Apr. 15, 2005, 14 pages.

DALE, Office Action, issued in U.S. Appl. No. 10/064,080, Jan. 19, 2006, 13 pages.

DALE, Office Action, issued in U.S. Appl. No. 10/064,080, 05/13/08, 10 pages.

Office Action issued in U.S. Appl. No. 11/855,348, mailed May 19, 2010, 6 pgs.

Office Action for U.S. Appl. No. 11/855,348, mailed Oct. 14, 2010, 8 pgs.

* cited by examiner (Prior Art)
Fig. 1

SYSTEM AND METHOD FOR SERVICING INQUIRY COMMANDS ABOUT TARGET DEVICES IN STORAGE AREA NETWORK

CROSS-REFERENCE TO RELATED APPLICATIONS

This is a divisional of U.S. patent application Ser. No. 10/064,080, filed Jun. 10, 2002, entitled "SYSTEM AND METHOD FOR INQUIRY CACHING," by inventors Stephen G. Dale and Bradfred W. Culp, and relates to U.S. patent application Ser. No. 11/855,348, filed Sep. 14, 2007, entitled "SYSTEM AND METHOD FOR INQUIRY CACHING IN A STORAGE AREA NETWORK," by inventors Stephen G. Dale and Bradfred W. Culp, both of which are incorporated herein by reference.

FIELD OF THE INVENTION

The invention relates generally to network systems and more particularly to systems and methods implemented in a network having a plurality of client devices that may submit commands to the same server device, wherein commands for relatively static data may be blocked until a previous command is serviced.

BACKGROUND OF THE INVENTION

A computer network is comprised essentially of a group of devices that are coupled together by a communication medium. A network may be as simple as two devices that are wired to each other, or as complex as the Internet. The devices in a network can communicate with each other and provide services to each other (or, conversely, use each other's services).

The devices may be of many different types. For example, some may be host devices (hosts) that initiate commands, while others may be devices which are designed to service the hosts (e.g., data storage devices). Networks may be configured in many different ways. For instance, referring to FIG. 1, one particular configuration of a storage area network (SAN) is illustrated. It should be noted that a SAN may be configured in many different ways, and that the configuration illustrated in FIG. 1 is exemplary.

Figure 1:
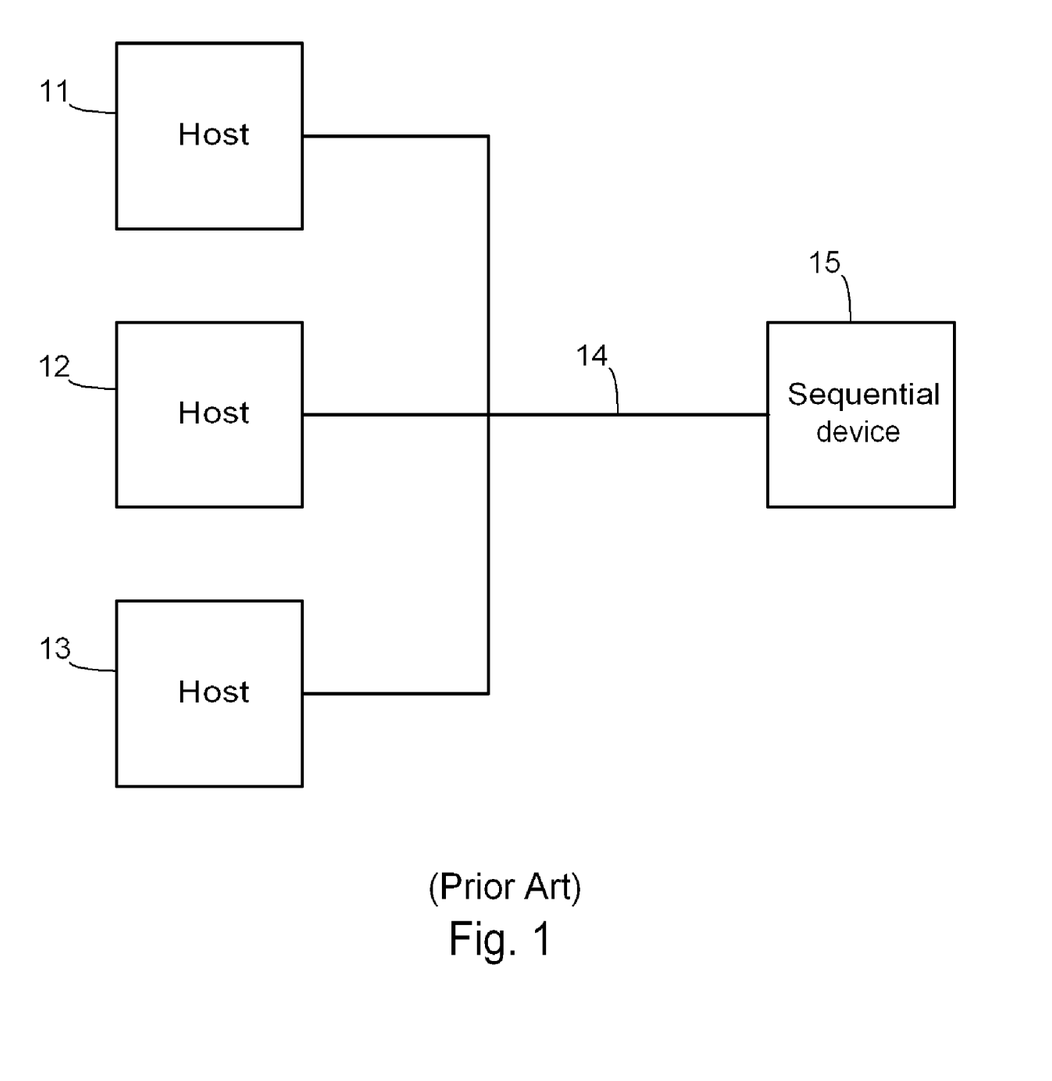
FIG. 1 is a diagram illustrating a plurality of host devices coupled to a sequential device in one embodiment.

In the SAN of FIG. 1, a plurality of hosts 11-13 are coupled to a sequential device 15 by a transmission medium 14. ("Sequential device," as used here, refers to a device that is sequentially accessed, such as a tape drive, rather than one which can be randomly accessed, such as a disk drive.) Sequential device 15 is configured to sequentially process requests for data which are received from hosts 11-13.

Hosts 11-13 may transmit several different kinds of commands to sequential device 15. One type of command is an inquiry command. "Inquiry command," for the purposes of this disclosure, will refer to commands which request data that, for the most part, is static. This data, which will be referred to herein as "inquiry data," typically relates to the device itself, rather than data which is designed to store or generate. For instance, inquiry data may include the serial number, manufacturer, configuration, version number, or similar data. It should be noted that, however, that inquiry data may also include data that changes relatively infrequently, rather than being strictly static.

Inquiry commands may be submitted to device 15 for various reasons. For example, when a new host is booted, it checks to see what other devices are connected to the network. Hosts may also periodically use inquiry commands to obtain information regarding the availability of devices on the network. If a device responds to the command, the host will receive the responsive inquiry data and will be aware that the device is available. If the device does not respond, the host may assume either that the device is no longer connected to the network, or that the device is no longer functioning properly.

One of the problems with handling inquiry commands in sequential devices is that these commands may be submitted to a sequential device just after the device has received a command that will take a substantial amount of time to process. Conventionally, no distinction is made between inquiry commands and other commands, so the inquiry command in this example will be handled in the same manner as any other command—it will be serviced when the device becomes available. Until the previously received command is serviced, the inquiry command will be blocked. If the inquiry command is blocked for long enough, it will time out. As a result of having timed out, the host may assume that the device is no longer operational or no longer connected to the network, even though it is both connected and operational.

It would therefore be desirable to provide a means for servicing inquiry commands in a sequential device while other commands are being processed by the device.

SUMMARY OF THE INVENTION

One or more of the problems outlined above may be solved by the various embodiments of the invention. Broadly speaking, the invention comprises systems and methods for storing inquiry data for a device so that inquiry commands to the device can be serviced when the device is busy processing a previously received command.

In one embodiment, a router contains a memory for storing static inquiry data corresponding to each of a plurality of sequential devices connected thereto. The first time a host sends an inquiry command to one of the sequential devices, the router routes the command to the target device and stores the data returned by the device. Subsequent inquiry commands are serviced by passing the command through to the target device if it is not busy, or returning inquiry data from the router's memory if the target device is busy processing another command. The router may be configured to determine whether the target device is busy in a number of ways, For example, it may track whether data has been returned in response to a command previously routed to the target device. The router may alternatively route all inquiry commands to the target device and, if the command is not serviced in a predetermined amount of time, the router may service the command from memory. Once the inquiry data has been stored in the router's memory, subsequent inquiry commands may be serviced either by always returning the data from the router's memory, or by returning the stored data only when the target device is busy and otherwise passing the command through to the target device so that it can service the request.

Another embodiment comprises a method in which inquiry data is stored in a memory apart from the corresponding target device, an inquiry command is subsequently received, and the inquiry command is serviced by returning the corresponding inquiry data from the memory. The method may further comprise routing an initial inquiry command to the target device, regardless of whether the target device is busy, and continuing to do so until the target device returns responsive inquiry data, which is then stored in the memory. The method may include tracking whether data has been returned in response to a command previously routed to the target device to determine whether a target device is busy, or it may comprise routing all inquiry commands to the target device and servicing the commands from memory if they are not serviced in a predetermined amount of time. The method may comprise always servicing inquiry commands by returning the data from the router's memory, or it may comprise returning the stored data only when the target device is busy.

Other embodiments may include computers or other data processing devices, computer readable storage media (such as floppy disks, CD-ROMs, DVD-ROMs, etc.) data storage devices, computer memories and the like which contain software, firmware or other programming which embodies the foregoing methods. Numerous other alternative embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

As noted above, host devices generally use the inquiry command to obtain information regarding the availability of devices on the network. If a host is booted up and a device on the network is busy, the device can't respond to the inquiry command. A mechanism is therefore necessary to provide the responsive data, thereby keeping the host's inquiry command from timing out and keeping the host from assuming that the device is not available.

Figure 2:
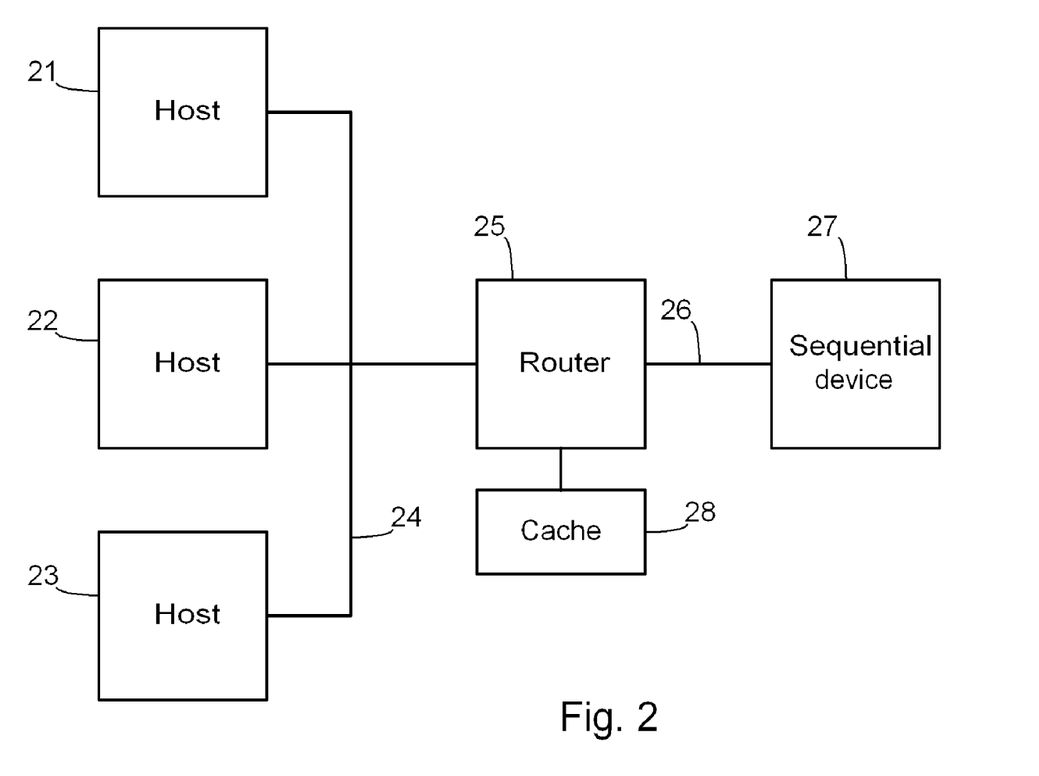
FIG. 2 is a diagram illustrating a system having a router configured to route the requests of several host devices to a sequential device.

Referring to FIG. 2, an exemplary system in accordance with one embodiment of the invention is shown. In this embodiment, a plurality of hosts 21-23 are coupled to a router 25. The hosts are configured to communicate with the router 25 over a Fibre Channel network 24. Router 25 is configured to convert data received from hosts 21-23 from the Fibre Channel protocol to the SCSI protocol. The data is then communicated over SCSI bus 26 to sequential device 27.

When one of hosts 21-23 needs to send a command to sequential device 27, it transmits the command to router 25, which then forwards the command to sequential device 27. If sequential device 27 is not processing any other commands, it is available to process the newly received command. If sequential device 27 is processing a previous command, the subsequently received command cannot be processed until the previous command is completed.

Router 25, however, is coupled to a cache 28. Cache 28 is designed to store inquiry data associated with sequential device 27. If sequential device 27 is busy processing a command when an inquiry command is received by router 25, the router is configured to examine the inquiry command, determine the data which is needed to respond to the command, and transmit the responsive data back to the host that generated the command.

This assumes, of course, that the cache contains the data necessary to respond to the inquiry command. When the router is booted, the cache contains no data. Consequently, it cannot provide any inquiry data in response to an inquiry command. If the router receives an inquiry command when the responsive data is not in the cache, and the sequential device itself is not available to provide responsive data, the result is the same as for prior art systems—the inquiry command is blocked and, if the device does not become available to service the command soon enough, the command will time out. If the sequential device becomes available in time, it will service the command.

Figure 3:
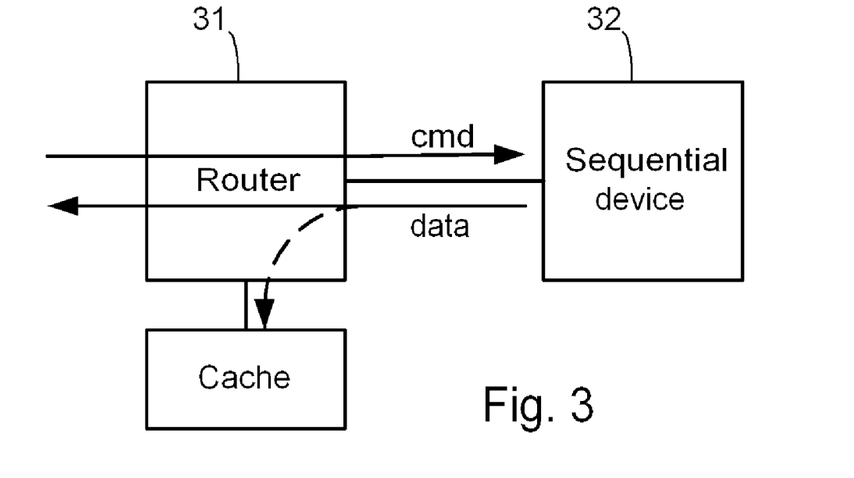
FIG. 3 is a diagram illustrating the routing of inquiry commands to a sequential device, the transmission of the responsive inquiry data and the storage of the inquiry data in a cache.

The first time the sequential device provides inquiry data to one of the hosts, the data is stored by the router in its cache. This is illustrated in FIG. 3. Thereafter, the router can provide the data in response to inquiry commands if the sequential device is busy.

Figure 4:
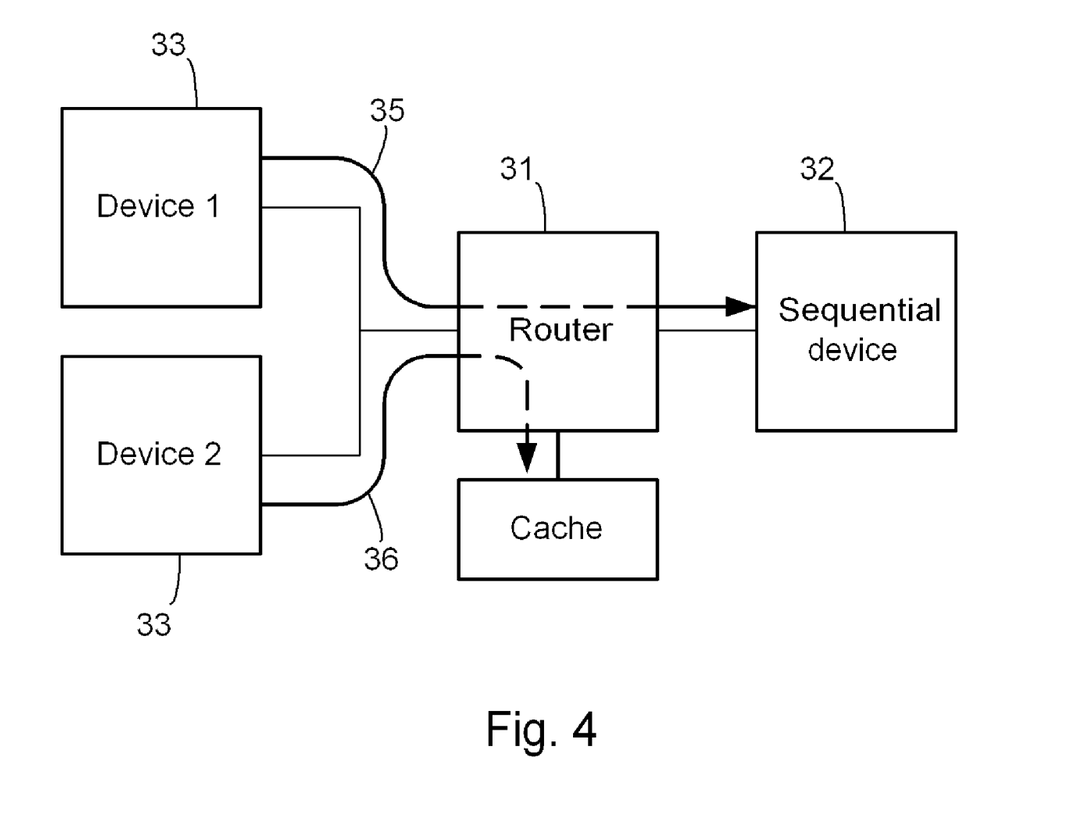
FIG. 4 is a diagram illustrating the apparent configuration of a router and a sequential device with respect to a device that submits an inquiry command while the sequential device is busy processing a previous command.

Referring to FIG. 4, a diagram illustrating the effect of the present system and method is shown. In this figure, two host devices, 33 and 34, are connected to router 31. Router 31 is, in turn, connected to sequential device 32. As depicted in the figure, host device 33 issues a command to sequential device 32. In this particular instance, there are no other commands pending with sequential device 32 (host device 34 has not yet issued a command). Router 31 therefore forwards the command to sequential device 32, which begins to process the command. (The command data path is indicated by arrow 35.)

It is assumed that the command issued by host device 33 is not an inquiry command and it takes a certain amount of time for sequential device 32 to process. While this first command is being processed by sequential device 32, host device 34 issues a command. The command issued by host device 34 is an inquiry command. When this command is received by router 31, the router detects that sequential device 32, which is the target of the command, is busy. Router 31 therefore accesses its cache (not shown) and retrieves the inquiry data necessary to service the inquiry command. (This command data path is indicated by arrow 36.) To host device 34, it appears that its inquiry command was serviced by sequential device 32.

Figure 5:
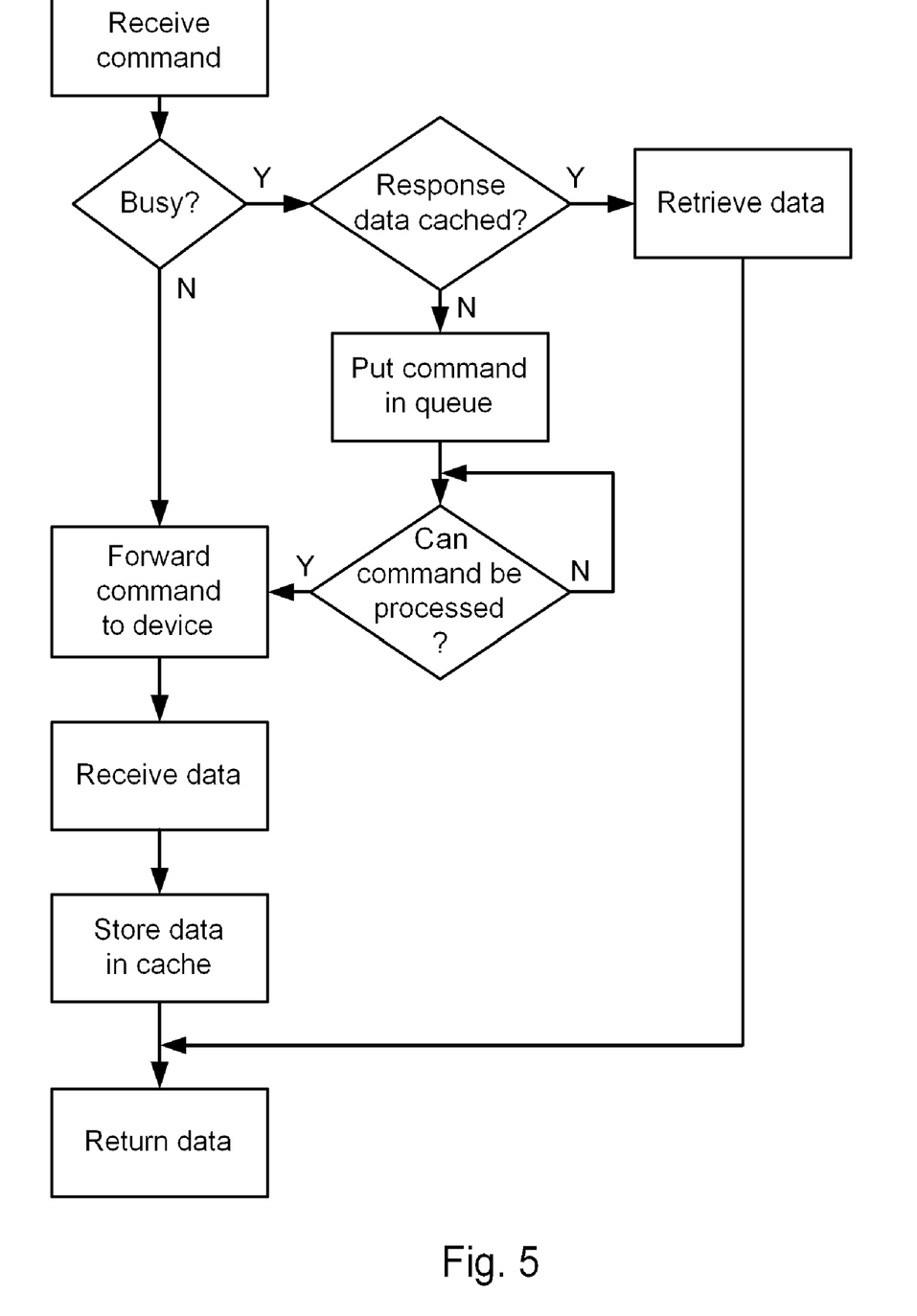
FIG. 5 is a flow diagram illustrating the operation of a router in accordance with one embodiment of the present invention.

Referring to FIG. 5, a flow diagram illustrating the operation of one embodiment of the present invention is shown. This figure corresponds to the functionality of a router as described above. The first, a command is received from one of the host devices. The router must then determine whether or not the target sequential device is busy. If that target device is not busy, the command is forwarded to the target device. After that target device processes that command, it provides data responsive to the command. This data is transmitted back to the router. The router does two things with the data: it stores the data in its cache; and it forwards the data to the host device that originally requested it. It should be noted that, if the return to data is truly static, the router need only store the data the first time it is returned. It is possible to skip the step of storing the data following subsequent responses to the same inquiry command. It is contemplated, however, that for purposes of simplicity, it will be preferred to store the data each time it is returned.

If, when the router receives the command from the host device, the target device is busy, the router will respond to the request if possible. In order to provide a response, the router must have the data necessary to service the request stored in its cache. It therefore checks the cache to determine whether or not it has this data. If the data is stored in the cache, the data is read from the cache and then forwarded to the host device in response to the inquiry command. If the data is not stored in the cache, the command is held by the router until the target device becomes available. If the command does not time out before the target device becomes available, it will be forwarded to the target device. When the target device returns data responsive to the inquiry command, the data will be stored in the cache of the router and forwarded to the host device that requested it.

It should be pointed out that some provision should be made for determining when a target device has been disconnected from the router. If no mechanism is provided for this purpose, the router and host devices may simply assume that the target device is busy. In this case, the host devices may continue to make futile attempts to access the device. Possibly worse, the router may continue to provide inquiry data in response to commands from the host devices, thereby perpetuating the fallacy that the target device is still available. If, on the other hand, the device is identified as having been disconnected, the router and host devices can identify the target device as such. As a result, the host devices will not waste time attempting to access the target device, and the router will not erroneously provide inquiry data for a non-existent member of the network.

Figure 6:
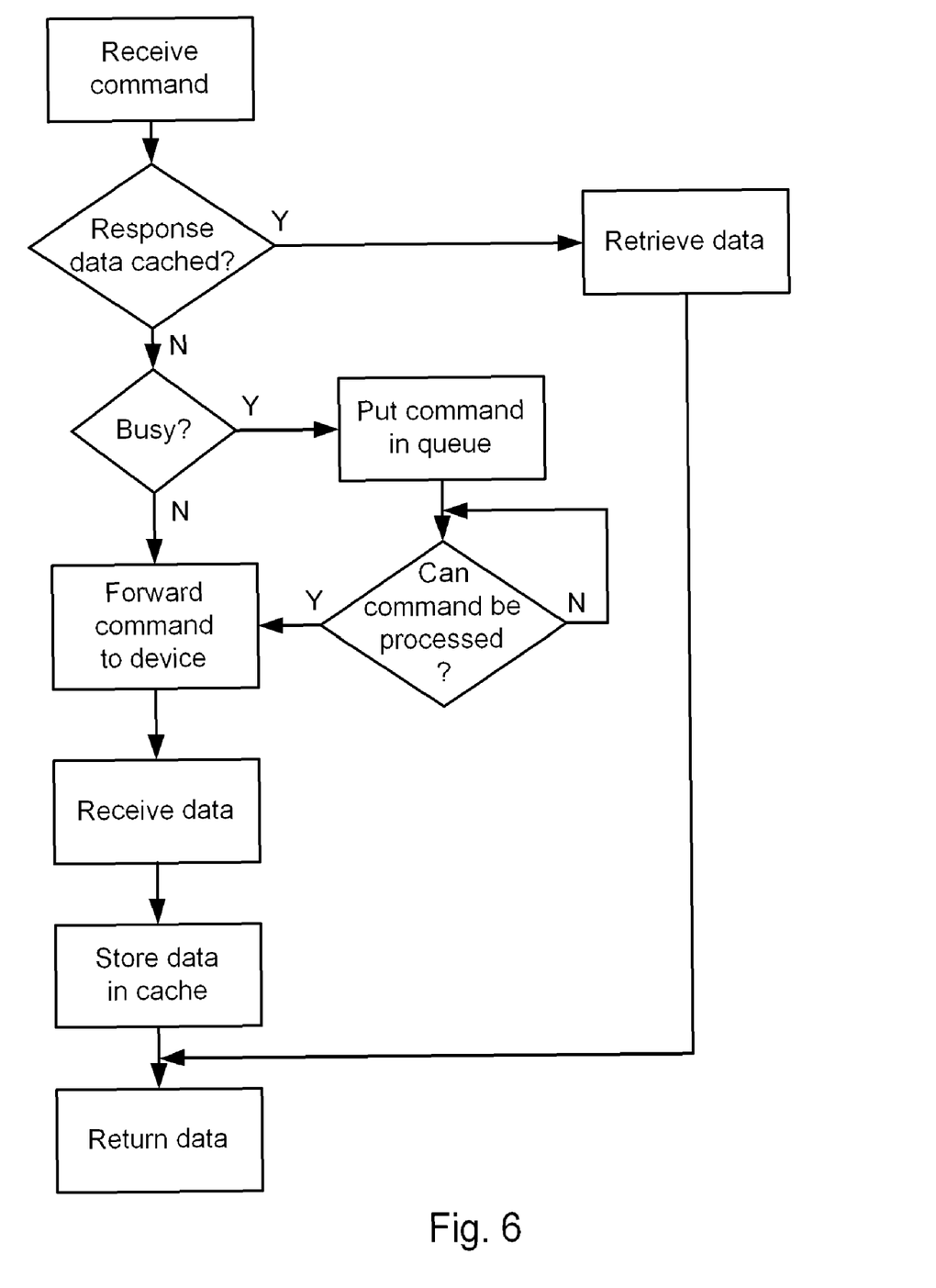
FIG. 6 is a flow diagram illustrating the operation of a router in accordance with an alternative embodiment of the present invention.
Figure 7:
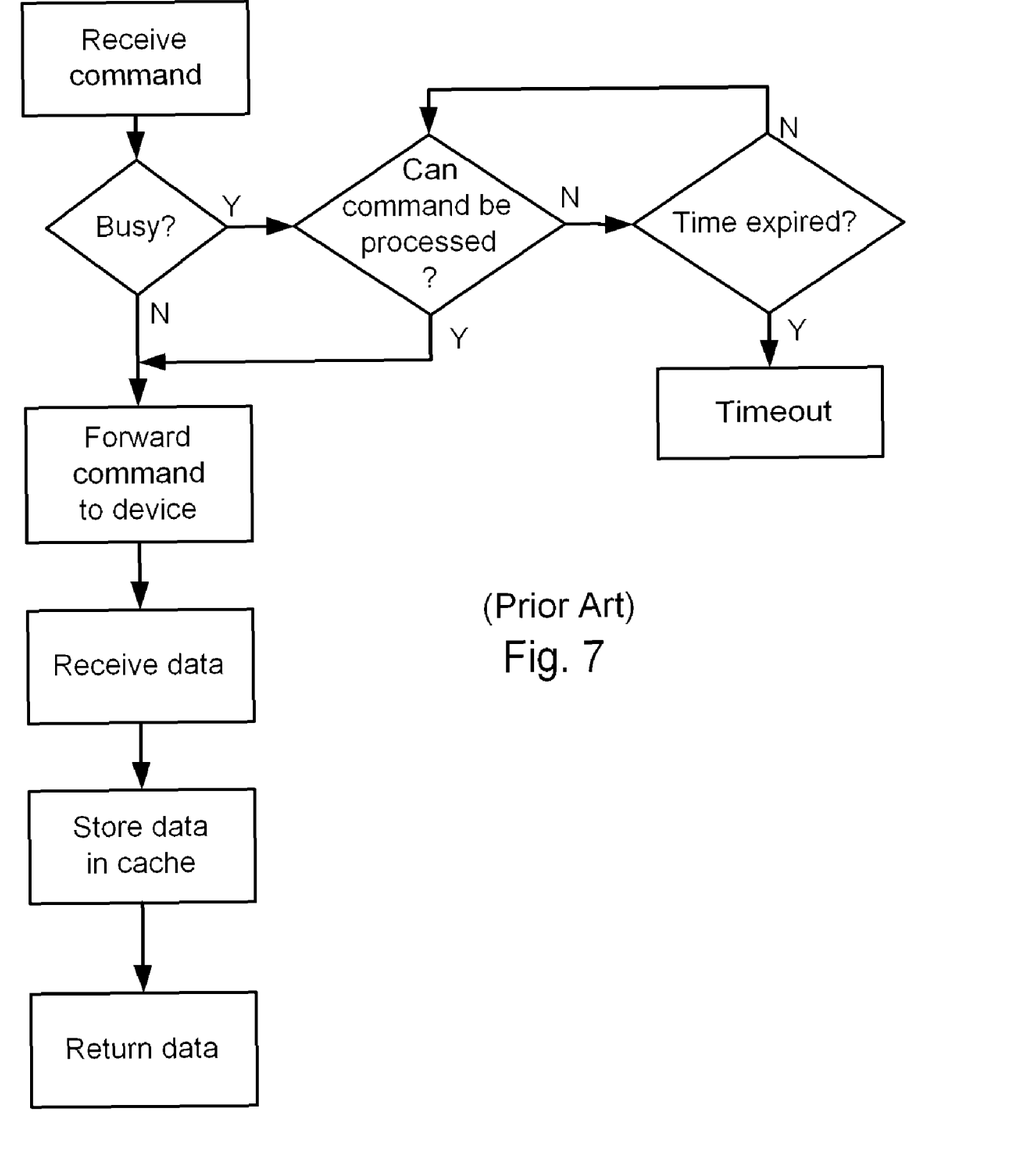
FIG. 7 is a flow diagram illustrating the operation of a prior art sequential device upon receipt of an inquiry command while the device is busy processing a previous command.

Referring to FIG. 6, a flow diagram illustrating the operation of an alternative embodiment of the present invention shown. This diagram is, in many respects, similar to the diagram of FIG. 5. In the diagram of FIG. 6, however, the router's first action with respect to any received inquiry command is to determine whether or not data responsive to the command is stored in its cache. If the data is in the cache, it is read from the cache and returned to the host device without accessing the target device. If the data is not in the cache, the router must determine whether or not the target device is busy. If the target device is not busy, the inquiry command is forwarded to it. The data returned by the target device would then be a forwarded to the requesting host device, as well as being stored in the router's cache for use in servicing future inquiry commands. If the target device is busy, the inquiry command is held until the target device becomes available. The inquiry command is then processed by the target device as it has not timed out.

The advantage of first checking the cache for the data is that the target device no longer has to deal with it. The command can be handled entirely by the router. The disadvantage of this embodiment is that it cannot be used when the inquiry data is slowly changing, as opposed to static. In the embodiment of FIG. 5, slowly changing data would be updated whenever a host device issued an inquiry command and the target device was not busy (and therefore responded to the command). In the embodiment of FIG. 5, the data which is originally stored in the cache in response to the inquiry command would be returned every time the inquiry command was received, regardless of whether or not the data that would be provided by the target device itself had changed. Thus, the embodiment of FIG. 6 would be sufficient if the inquiry data never changed, but not if the data were slowly changing.

It should be noted that the flow diagrams of FIGS. 5 and 6 do not explicitly include the step of determining whether a received command comprises an inquiry command or other command requesting static or near-static data. If the received command is a request for sequential data stored on the device, there is no need to process the command according to the flow diagrams, since the data will not be stored in the same manner as inquiry data. The determination that a received command is a request for sequential data will therefore cause the remainder of the flow diagram to be bypassed. If the received command is an inquiry command, the method of the flow diagram will proceed.

It should be noted that, although the embodiments described above are directed to systems in which a router is used to couple a set of Fibre Channel hosts to a SCSI device, the present systems and methods are not limited to use in Fibre Channel-to-SCSI systems, nor is it necessary that there be any protocol conversion at all. Other embodiments may use devices coupled between communication media having other protocols, or even between media having protocols which are identical to each other. Further, it is not necessary that the systems/methods be implemented in a router. Other embodiments may employ alternative types of devices to perform the functions of the routers described above (i.e., the storage and return of inquiry data). For example, this functionality may be incorporated into circuitry within the sequential device. Another embodiment may comprise a software application (and/or the media on which the application is stored) for controlling a router or other device to provide the desired functionality.

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted non-exclusively, including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. For example, these variations may include computers or other data processing devices, computer readable media (such as floppy disks, CD-ROMs, DVD-ROMs, etc.) storage devices, computer memories and the like which contain software, firmware or other programming which embodies the foregoing methods. It is contemplated that these variations, modifications, additions and improvements fall within the scope of the invention as detailed within the following claims.

What is claimed is:

1. A method for servicing inquiry commands, comprising:

at a router connected to sequential target devices on a storage area network (SAN), receiving from a host device an inquiry command for information about a target device;

determining whether or not the information about the target device is stored in a cache memory coupled to the router;

if the information about the target device is in the cache memory, retrieving the information about the target device from the cache memory and returning the retrieved information about the target device to the host device in response to the inquiry command regardless of whether or not the target device is busy;

if the information about the target device is not in the cache memory, determining whether or not the target device is busy;

if the target device is not busy, forwarding the inquiry command from the host device to the target device; and if the target device is busy, placing the inquiry command from the host device in a queue at the router, holding the inquiry command from the host device in the queue at the router until the target device becomes available, and forwarding the inquiry command from the host device to the target device for processing by the target device when the target device becomes available, thereby keeping the inquiry command from the host device from timing out, the method further comprising: at the router, determining whether a first command received from a first host device coupled to the router comprises a first inquiry command for static or near-static data about a first target device on the SAN;

if the first command from the first host device comprises the first inquiry command for the static or near-static data about the first target device, reading the static or near-static data about the first target device from the cache memory and providing the static or near-static data about the first target device to the first host device in response to the first inquiry command from the first host device; and if the first command from the first host device does not comprise the first inquiry command for the static or near-static data about the first target device, forwarding the first command to the first target device for execution of the first command.

2. The method according to claim 1, further comprising:

receiving, at the router, inquiry data from the target device, wherein the inquiry data is responsive to the inquiry command from the host device;

storing the inquiry data from the target device in the cache memory; and returning the inquiry data to the host device in response to the inquiry command.

3. The method according to claim 2, further comprising:

receiving, at the router, one or more subsequent inquiry commands for the information about the target device from one or more host devices connected to the router;

retrieving the inquiry data from the cache memory; and returning the inquiry data to the one or more host devices in response to the one or more subsequent inquiry commands for the information about the target device.

4. The method according to claim 3, wherein the inquiry data from the target device is static and does not change over time.

5. The method according to claim 2, wherein the inquiry data from the target device comprises Small Computer System Interface (SCSI) response data.

6. The method according to claim 1, further comprising:

at the router, upon receiving from a first host device a first request for static or near-static data about a first target device, forwarding the first request to the first target device regardless of whether or not the first target device is busy;

storing the static or near-static data about the first target device returned by the first target device in response to the first request in the cache memory;

forwarding the static or near-static data about the first target device returned by the first target device in response to the first request to the first host device coupled to the router; and in response to subsequent requests for the static or near-static data about the first target device, reading the static or near-static data about the first target device returned by the first target device in response to the first request from the cache memory and providing the static or near-static data about the first target device returned by the first target device in response to the first request in response to the subsequent requests.

7. A device for servicing inquiry commands, comprising:

a router connected to one or more host devices and one or more sequential target devices on a storage area network (SAN); and a cache memory coupled to the router, wherein the router is configured to:

receive from a host device an inquiry command for information about a target device;

determine whether or not the information about the target device is stored in the cache memory;

if the information about the target device is in the cache memory, retrieve the information about the target device from the cache memory and return the retrieved information about the target device to the host device in response to the inquiry command regardless of whether or not the target device is busy;

if the information about the target device is not in the cache memory, determine whether or not the target device is busy;

if the target device is not busy, forward the inquiry command from the host device to the target device; and if the target device is busy, place the inquiry command from the host device in a queue, hold the inquiry command from the host device in the queue until the target device becomes available, and forward the inquiry command from the host device to the target device for processing by the target device when the target device becomes available, thereby keeping the inquiry command from the host device from timing out, wherein the router is further configured to:

determine whether a first command received from a first host device coupled to the router comprises a first inquiry command for static or near-static data about a first target device on the SAN;

if the first command from the first host device comprises the first inquiry command for the static or near-static data about the first target device, read the static or near-static data about the first target device from the cache memory and provide the static or near-static data about the first target device to the first host device in response to the first inquiry command from the first host device; and if the first command from the first host device does not comprise the first inquiry command for the static or near-static data about the first target device, forward the first command to the first target device for execution of the first command.

8. The device of claim 7, wherein the router is further configured to:
receive inquiry data from the target device, wherein the inquiry data is responsive to the inquiry command from the host device;
store the inquiry data from the target device in the cache memory; and
return the inquiry data to the host device in response to the inquiry command.

9. The device of claim 8, wherein the router is further configured to:
receive one or more subsequent inquiry commands for the information about the target device from the one or more host devices;
retrieve the inquiry data from the cache memory; and
return the inquiry data to the one or more host devices in response to the one or more subsequent inquiry commands for the information about the target device.

10. The device of claim 9, wherein the inquiry data from the target device is static and does not change over time.

11. The device of claim 8, wherein the inquiry data from the target device comprises Small Computer System Interface (SCSI) response data.

12. The device of claim 8, wherein the inquiry data from the target device comprises a serial number of the target device, a manufacturer of the target device, a configuration of the target device, a version number of the target device, or a combination thereof.

13. The device of claim 7, wherein the router is further configured to:
upon receiving from a first host device a first request for static or near-static data about a first target device, forward the first request to the first target device regardless of whether or not the first target device is busy;
store the static or near-static data about the first target device returned by the first target device in response to the first request in the cache memory;
forward the static or near-static data about the first target device returned by the first target device in response to the first request to the first host device; and
in response to subsequent requests for the static or near-static data about the first target device, read the static or near-static data about the first target device returned by the first target device in response to the first request from the cache memory and provide the static or near-static data about the first target device returned by the first target device in response to the first request in response to the subsequent requests.

14. A system for servicing inquiry commands, comprising:
one or more host devices;
one or more sequential target devices on a storage area network (SAN);
a router connected to the one or more host devices and the one or more sequential target devices on the SAN; and
a cache memory coupled to the router, wherein the router is configured to:
receive from a host device an inquiry command for information about a target device;

determine whether or not the information about the target device is stored in the cache memory;
if the information about the target device is in the cache memory, retrieve the information about the target device from the cache memory and return the retrieved information about the target device to the host device in response to the inquiry command regardless of whether or not the target device is busy;
if the information about the target device is not in the cache memory, determine whether or not the target device is busy;
if the target device is not busy, forward the inquiry command from the host device to the target device; and
if the target device is busy, place the inquiry command from the host device in a queue, hold the inquiry command from the host device in the queue until the target device becomes available, and forward the inquiry command from the host device to the target device for processing by the target device when the target device becomes available, thereby keeping the inquiry command from the host device from timing out, wherein the router is further configured to:
determine whether a first command received from a first host device coupled to the router comprises a first inquiry command for static or near-static data about a first target device on the SAN;
if the first command from the first host device comprises the first inquiry command for the static or near-static data about the first target device, read the static or near-static data about the first target device from the cache memory and provide the static or near-static data about the first target device to the first host device in response to the first inquiry command from the first host device; and
if the first command from the first host device does not comprise the first inquiry command for the static or near-static data about the first target device, forward the first command to the first target device for execution of the first command.

15. The system of claim 14, wherein the router is further configured to:
receive inquiry data from the target device, wherein the inquiry data is responsive to the inquiry command from the host device;
store the inquiry data from the target device in the cache memory; and
return the inquiry data to the host device in response to the inquiry command.

16. The system of claim 15, wherein the router is further configured to:
receive one or more subsequent inquiry commands for the information about the target device from the one or more host devices;
retrieve the inquiry data from the cache memory; and
return the inquiry data to the one or more host devices in response to the one or more subsequent inquiry commands for the information about the target device.

17. The system of claim 14, wherein the router is further configured to:
upon receiving from a first host device a first request for static or near-static data about a first target device, forward the first request to the first target device regardless of whether or not the first target device is busy;
store the static or near-static data about the first target device returned by the first target device in response to the first request in the cache memory;

forward the static or near-static data about the first target device returned by the first target device in response to the first request to the first host device; and in response to subsequent requests for the static or near-static data about the first target device, read the static or near-static data about the first target device returned by the first target device in response to the first request from the cache memory and provide the static or near-static data about the first target device returned by the first target device in response to the first request in response to the subsequent requests.

\* \* \* \* \*